United States Patent [19]

Petershofer et al.

[11] Patent Number: 4,865,807
[45] Date of Patent: Sep. 12, 1989

[54] HIGH PRESSURE DECORATIVE LAMINATES

[75] Inventors: Georg Petershofer, Wiener Neudorf; Horst Felzmann, Vienna, both of Austria

[73] Assignee: Isovolta Osterreichische Isolierstoffwerke Aktiengesellschaft, Vienna, Austria

[21] Appl. No.: 116,030

[22] Filed: Nov. 3, 1987

[51] Int. Cl.$^4$ .............................................. B32B 3/00
[52] U.S. Cl. ............................... 428/161; 156/222; 156/223; 156/224; 156/268; 156/307.4; 264/292; 428/503; 428/524; 428/526; 428/530; 428/531
[58] Field of Search ............... 428/526, 530, 531, 161, 428/167, 503, 524; 156/222, 223, 307.4, 224, 268; 264/292

[56] References Cited

U.S. PATENT DOCUMENTS

| | | | |
|---|---|---|---|
| 3,294,622 | 12/1966 | Wark | 428/531 |
| 3,378,433 | 4/1968 | Palazzolo et al. | 156/307.4 |
| 3,943,022 | 3/1976 | Susujara | 156/268 |
| 4,002,790 | 1/1977 | Trewiler | 156/222 |
| 4,288,491 | 9/1981 | Surzhenko et al. | 428/531 |
| 4,533,588 | 8/1985 | Kraft | 156/222 |

Primary Examiner—Paul J. Thibodeau
Attorney, Agent, or Firm—Bierman and Muserlian

[57] ABSTRACT

A high pressure laminate comprising a plurality of heat molded sheets impregnated with duromeric synthetic resins characterized in that several of these sheets form on at least one surface of the laminate a heat-shapable surface layer (2,3) while the remaining sheets form a non-heat-shapable region which includes a core layer of the laminate.

7 Claims, 1 Drawing Sheet

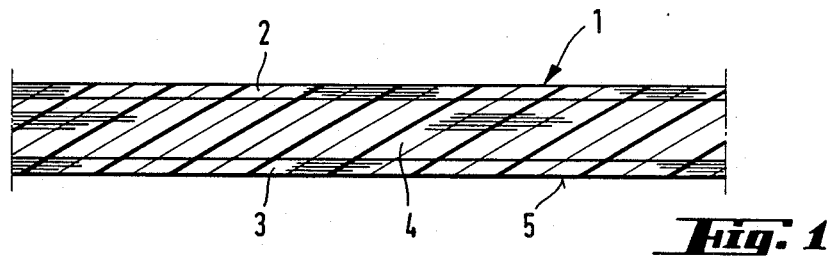
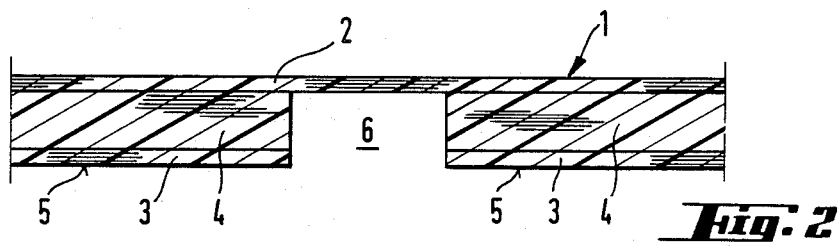
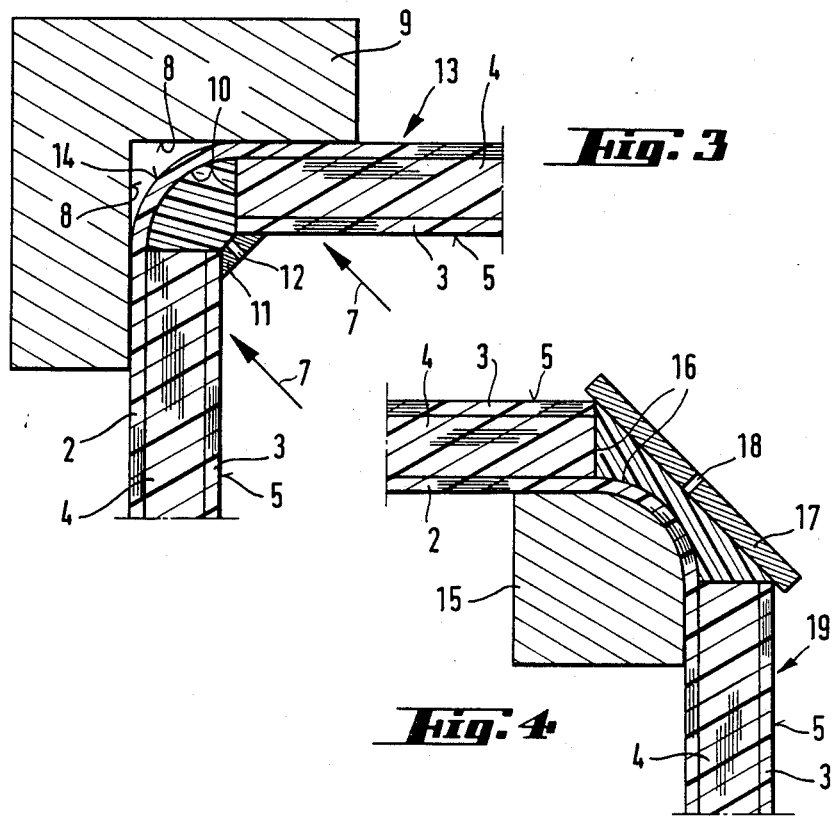

HIGH PRESSURE DECORATIVE LAMINATES

STATE OF THE ART

A rising trend in the last few years in the furniture industry and in the manufacturing of laminates has been toward articles with rounded surface contours. Decorative laminates of this nature have been made from "postforming" laminates consisting of a plurality of heat-moldable sheets impregnated with duromeric synthetic resins such as phenolic resins and melamine resins, especially paper sheets with these syynthetic resins not completely cured after the making of the laminate by molding so they can be brought to their final rounded shape by heating and bending it.

Due to the slight elongation at tear of the impregnated paper, the inner bending radii can not be smaller than approximately 8 to 10 times the thickness of the laminate. The post-forming laminates have therefore had a thickness of only 0.5 to 1.2 mm and could not be used as self-supporting structures for most purposes. The laminates generally had to be first bent and then glued onto a corresponding shaped substrate usually made of wood or wood particle board.

Austrian Pat. No. 349,766 describes the manufacture of heat-shapable laminates having a significantly greater laminate thickness of 10 mm or more than the known post-forming laminates so that they could be used to form mechanically self-supporting articles. This laminate comprises a plurality of individual laminations, each of which is formed separately of one or more support webs impregnated with post-forming, thermosetting resins, and of thermoplastic binder layers arranged between the individual laminations and forming joints between them. For the production of a structural part made of such a laminate, a laminate sheet is heated to a temperature higher than the softening temperature of the thermoplastic binder and is thereupon bent around a cylindrical surface, whereby the laminations of the sheet shift relative to each other in a deformation area in the direction of the sheet surface, and, after termination of the bending process, is finally cooled at least until the binder solidifies again.

The said laminates of the Austrian patent have a variety of areas and applications but there are some application areas in which additional properties are required which could not be met by the heat-shapable laminate of Austrian Pat. No. 349,766, especially wet strength and increased flame resistance. To increase wet strength of molded laminates, a phenolic based resin of low molecular weight resin components having a higher reactivity than normal is used and these components react to a higher degree with the paper fibers in the sheets during curing so that post-forming of the resulting laminates is no longer possible.

It is not possible to add flame retardants to increase the flame resistance of the laminates because the water absorption of the post-forming laminates which already is greater than in conventional laminates is increased even more to unacceptable high levels.

OBJECTS OF THE INVENTION

It is an object of the invention to provide high-pressure laminates having increased wet strength and/or flame resistance from which can be produced simple self-supporting structural elements.

It is another object of the invention to provide a novel method of producing structural parts with at least one rounded surface.

These and other objects and advantages of the invention will become obvious from the following detailed description.

THE INVENTION

The novel high-pressure laminates of the invention comprising a plurality of heat molded sheets impregnated with durometric synthetic resins are characterized in that several of these sheets form on at least one surface of the laminate a heat-shapable surface layer while the remaining sheets form a non-heat-shapable region which includes a core layer of the laminate.

In a preferred embodiment of the invention, the laminate comprises (C) core paper sheets (180 g/m$^2$) impregnated with a phenolic resin at about 80 g of resin per square meter, (B) a barrier layer of paper sheets (180 g/m$^2$) impregnated with a phenolic resin at about 70 g/m$^2$ and (A) an outer decorative layer of paper (100 g/m$^2$) impregnated with a melamine resin at 120 g/m$^2$, the said resins being post-forming resins, and (D) the inner-most core being formed of core paper sheets impregnated with a phosphate based flame retardant and a non-post-forming phenolic resin at about 90 g/m$^2$ of resin.

To produce an approximately 10 mm thick laminate, the elements A to D would be used to form a stack in the following sequence: A, B, 5C, A, 37D, A, 5C, B, A. The said laminates may be produced by molding such a stack at 130° C. for 20 minutes.

Referring now to the drawings:

FIG. 1 is a partial cross-section of a laminate before bending and

FIG. 2 is a partial cross-section of the laminates of FIG. 1 with the groove for bending.

FIG. 3 is a partial cross-section of laminate of FIG. 2 after bending 90°.

FIG. 4 is a partial cross-section of a laiminate with a concave rounded surface.

Referring now to FIGS. 1 to 3, the laminate of FIGS. 1 to 3 is provided with the heat-shapable layers 2,3 formed in the element sequence of A, B, 5C, A respectively and the non-heat-shapable core layer 4 is formed of 37 resin impregnated D layers containing a flame retardant. Although surface layers 2 and 3 don't contain a flame retardant, the resulting finished laminates have a greater flame resistance than the laminates of Austrian Pat. No. 349,766.

As can be seen from FIG. 2, the laminate 1 has a groove 6 milled from surface 5 by removal of surface layer 3 and core layer 4, leaving only surface layer 2 intact. The laminate 1 is heated at least in the bending area to the deformation temperature which is usually 160° to 180° C. and as shown schematically in FIG. 3 is bent in the area of groove 6 by 90°. The bend area is then pressed in the direction of the arrows 7 against the contact face 8 of a forming die 9 which is maintained at a temperature of approximately 50° to 80° C., and then held firm. The groove space 10 deformed by the bending of the laminate 1 is closed with a closing strip 11. Then a polyurethane casting substance is poured into the space 10 through opening 12 which cures in a short time to the extent that the closing strip 11 can be removed and the finished structural element 13 can be lifted off the forming die 9. The structural element 13 now has at the site of its angle bend a convexly rounded surface region 14, while its angle bend is mechanically strengthened through the introduced polyurethane casting substance. For filling the deformed groove space 10, expoxy resins, polyester resins, and similar ones can also be used. Another method of mechanically strengthening the angle bend consists in that a section bar, which has approximately the same cross-section as the deformed groove space 10 is glued into the latter.

From a laminate 1 provided with a groove 6 as shown in FIG. 2, a structural element can be produced which is intended to have in place of the angle bend a concavely rounded surface area. To accomplish this, a laminate 1 provided with a groove 6 is at least in the region of groove 6 heated to the deformation temperature and then, as shown schematically in FIG. 4, angle bent by 90° around a bending template 15 maintained at approximately 50° to 80° C., and held there. Analogous to the processing variant described in conjunction with FIG. 3, the groove space 16 formed by bending the laminate 1 is sealed with a closing strip 17 and through opening 18 a polyurethane casting substance is introduced into space 16 and cured thereafter. After removing the closing strip 17, the finished structural element 19 is lifted from the bending template 15.

The method of the invention can be used to particular advantage if several possibly different angle bends are to be carried out on the laminate. In this case, first and possibly simultaneously the grooves required for the angle bends are milled into the laminate which is then heated to the deformation temperature, in each instance angle bent in the region of the grooves by bending, and with the air of a multiple shape fixing die is held in this angle bend shape. Then follows the injection of the polyurethane casting substance into the groove spaces formed by the angle bending of the laminate.

Grooves of diverse cross-sectional shape can be provided instead of a groove with a rectangular cross-section, for example those which after angle bending the laminate are deformed to a cross-section of very small area or those having groove-side faces which after angle bending touch each other whereby possibly these side faces in contact with each other being glued together, a process by which the angle bend of the board is mechanically strengthened.

Various other modifications of the laminates and process of the invention may be made without departing from the spirit or scope thereof and it is to be understood that the invention is intended to be limited only as defined in the appended claims.

What we claim is:

1. A. high pressure laminate comprising a plurality of heat molded sheets impregnated with phenol or melamine based duromeric resins, characterized in that part of the sheets forms a heat shapable surface layer at least at one surface of the laminate, each surface layer comprising beginning at the laminate's surface in the following order, a decorative layer with a melamine resin impregnated decorative paper sheet, a phenol or melamine based resin impregnated paper sheet as a first barrier sheet, at least one paper sheet impregnated with a phenol based resin and a phenol or melamine based resin impregnated paper sheet as a second barrier sheet, and that the remaining sheets form a non-heat-shapable region which includes a core layer of the laminate comprised of paper sheets impregnated with phenol based resin, whereby the non-heat-shapable core layer has a thickness of at least 2 mm and contains a flame retardant.

2. A laminate of claim 1 wherein at both sides of the laminate heat-shapable layers (2,3) are provided.

3. A laminate of claim 2 wherein the laminate is symmetrical with respect to its center plane.

4. A laminate of claim 1 wherein at least one of the heat-shapable layers (2,3) has a thickness of 0.5 to 2.0 mm.

5. A laminate of claim 1 wherein the core (4) contains a resin imparting increased wet strength to the core layer (4).

6. A method of producing a structural part made of a high-pressure laminate of claim 1 with an angle bend therein to form a rounded surface area of the laminate comprising making a groove 6 in the laminate extending parallel to the axis of the desired angle bend by removal of the material of the laminate over a major portion of the groove width while maintaining a heat-shapable surface layer (2) at the bottom of the groove, heating the surface layer (2) to the heat-shaping temperature and then heat bending the laminate to form the angle and optionally filling the space of the bent groove at least partially with another material to mechanically strength the angle bend of the laminate.

7. The high pressure laminate produced by the method of claim 6.

* * * * *